Jan. 18, 1938.  J. A. SLACK  2,105,557
VISUALIZING CAMERA
Filed March 19, 1935  3 Sheets-Sheet 1
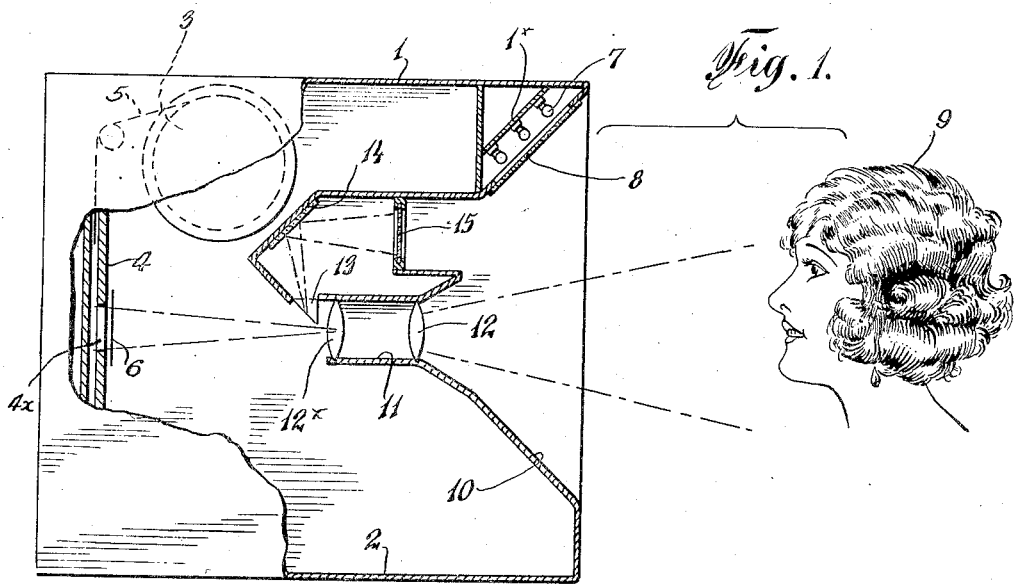
Fig. 1.
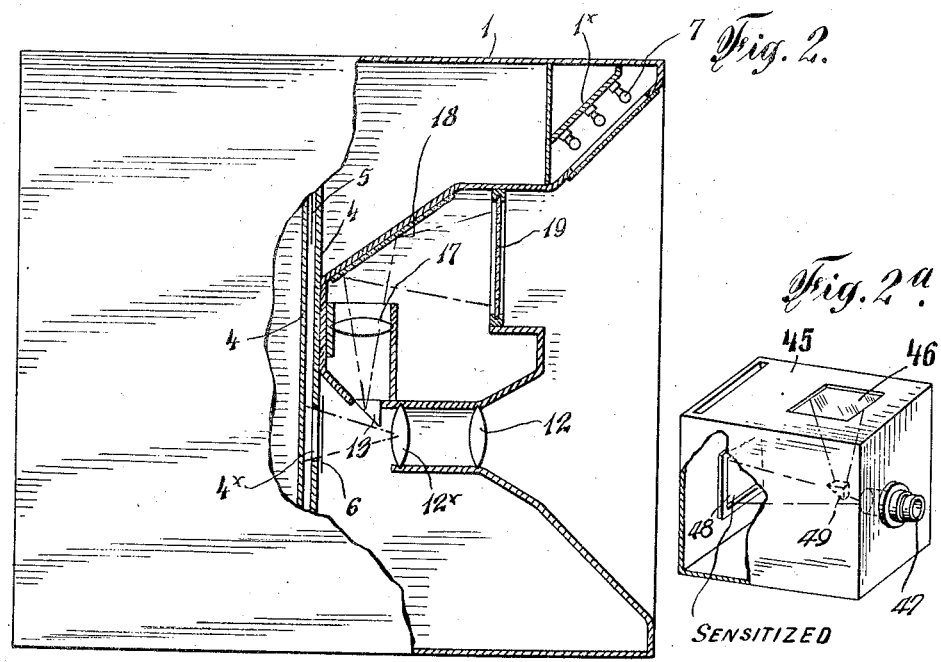
Fig. 2.
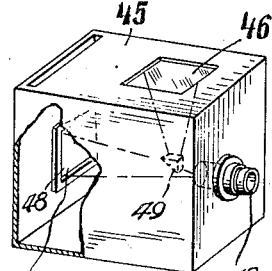
Fig. 2ª.
INVENTOR
John A. Slack
BY
ATTORNEY Jan. 18, 1938. J. A. SLACK 2,105,557
VISUALIZING CAMERA
Filed March 19, 1935  3 Sheets-Sheet 2
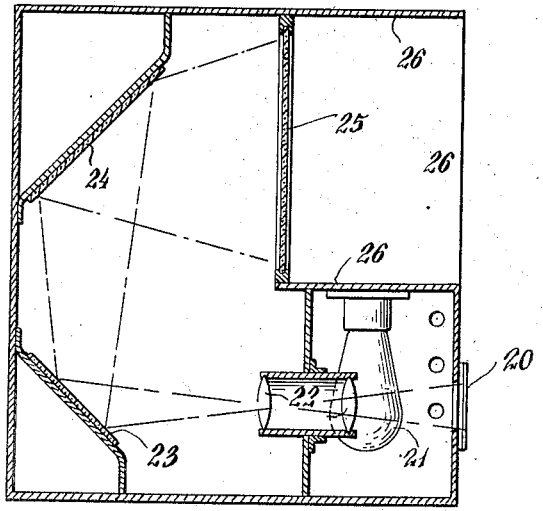
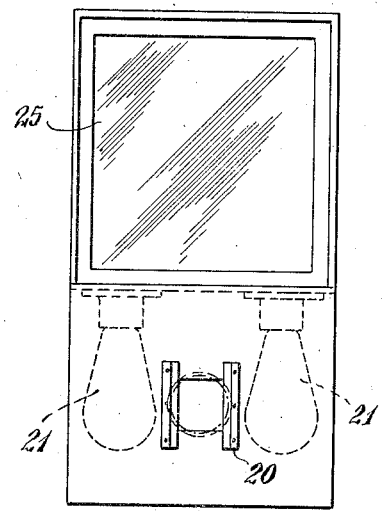
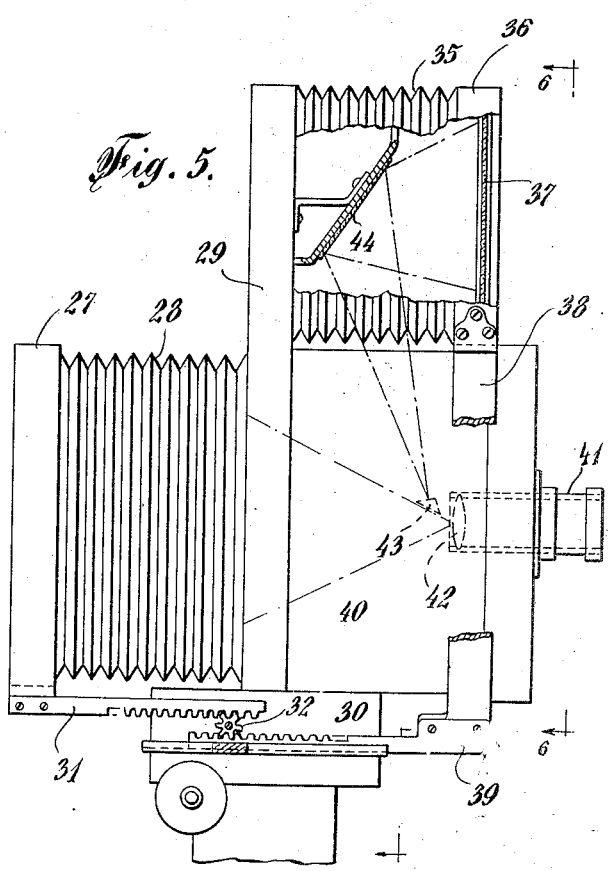
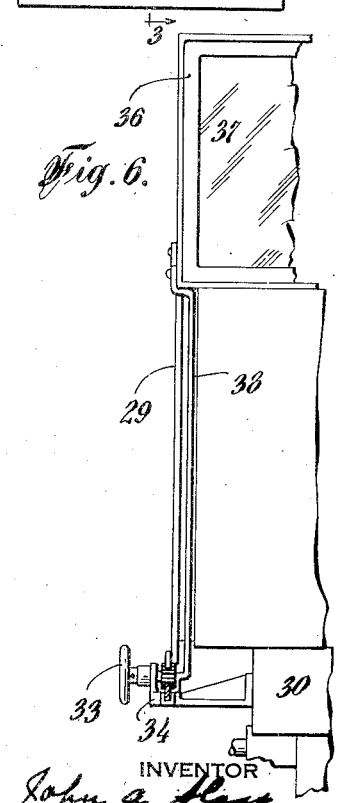
INVENTOR
John A. Slack
BY H. Lee Helms
ATTORNEY Jan. 18, 1938.                J. A. SLACK                2,105,557
                         VISUALIZING CAMERA
               Filed March 19, 1935          3 Sheets-Sheet 3
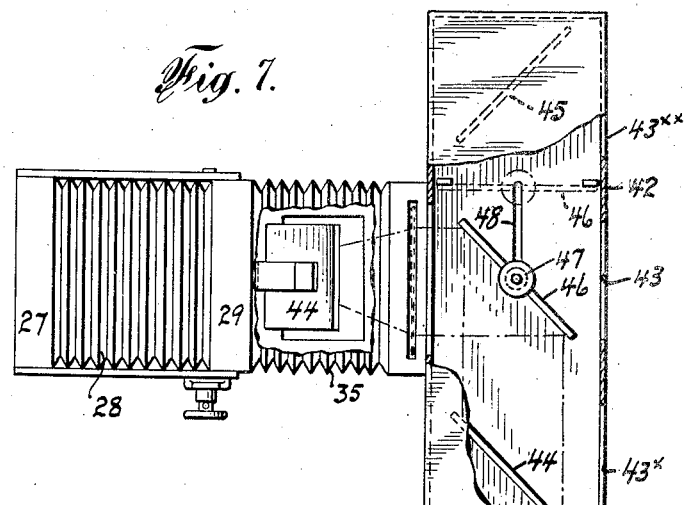
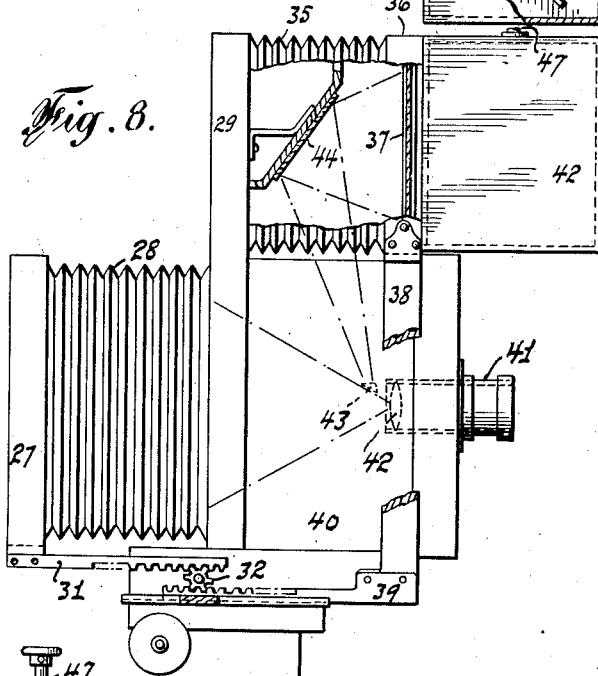
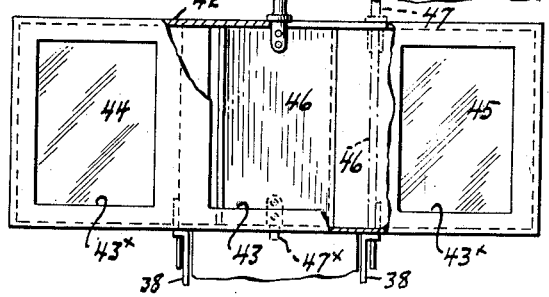
INVENTOR.
John A. Slack
BY
ATTORNEY Patented Jan. 18, 1938

2,105,557

UNITED STATES PATENT OFFICE 2,105,557

VISUALIZING CAMERA

John A. Slack, Jamaica, N. Y.

Application March 19, 1935, Serial No. 11,798

4 Claims. (Cl. 88—1)

The object of the present invention is to provide means for enabling a person at the front and within the range of a camera or a small photograph placed at the front of the camera to cause an image of the person or small photograph to be thrown back, preferably in enlarged form, upon a ground glass or other reception means, for observation. Thus, in one form of the invention, a person being photographed can visualize the pose and details of the photograph as it will be produced upon the sensitized medium, and change the pose accordingly, and a person placing a photographic print in position can immediately visualize an enlargement thereof. In both cases, the image is thrown in front of the device, i. e., with the point where the image is initially transmitted.

A further object of the invention is, in one form of the invention, to enable the image to be transmitted through lenses, thence split up into an image projected upon the sensitized medium and an image reflected back to the visualizing ground glass or other reception medium.

A further object of the invention is to provide simultaneous focusing or change in area of the image thrown upon the sensitized medium and focusing or change in area of the image thrown upon the visualizing medium.

Further objects of the invention will hereinafter appear.

The invention will be described with reference to the accompanying drawings in which:

Fig. 1 is an embodiment of the invention in elevation, a side wall being broken away to expose the interior, the embodiment throwing the image upon the visualizer with an area the same as the image area thrown upon the sensitized medium.

Fig. 2 is a view similar to Fig. 1, showing a modification in which the image thrown upon the visualizer is enlarged relatively to the area of the image projected upon the sensitized medium.

Fig. 2A is a view largely schematic and in elevation, showing a box type of camera with a simple form of visualizer at the top thereof, the visualizer having diverted thereto part of the rays projected by the lens to the sensitized plate or other medium.

Fig. 3 is a view in sectional elevation of a camera box adapted to receive at the front thereof a small photograph or other image for projection to a visualizing medium also at the front.

Fig. 4 is a front elevation of the device shown in Fig. 3.

Fig. 5 is a front elevation, partly broken away, of a bellows-type of camera having simultaneous adjustment for the primary camera bellows and the visualizer.

Fig. 6 is a fragmentary elevation of the construction shown in Fig. 5.

Fig. 7 is a plan view, partly broken away, of an embodiment of the invention having added thereto means by which a portrait sitter may face in a direction away from the axis of the lens and yet visualize his profile, for example, the latter being within the range of the lens.

Fig. 8 is a side elevation of the structure shown in the preceding figure, the top bellows being partly broken away, and Fig. 9 is a partial front elevation, partly broken away.

Referring to Fig. 1, I have shown a camera box comprising a top wall 1, a bottom wall 2, a container 3 for a roll of sensitized paper or film, parallel vertical guide walls 4 for the film, the latter being shown at 5, the front wall 4 being apertured at 4x for passage of the image. A shutter is schematically shown at 6.

Below wall 1 at the front thereof, is a panel 1x affording a support for a plurality of lighting elements 7, the light being thrown through a glass 8 and thence forwardly upon the face of a person indicated at 9. Part of the light rays are thrown upon a reflector 10 which in turn throws rays upwardly to remove shadows.

Within and centrally of the device is a tubular support 11 for the lenses 12, 12x and rearwardly of lens 12x and extending a distance equivalent to only part of the longitudinal axis of lens 12x is a prism 13. Angularly arranged above prism 13 is a reflector 14 and forwardly of the reflector is a ground glass 15.

In the use of the device illustrated in Fig. 1, the reflected image from a person being photographed is thrown through the lenses 12, 12x and thence upon the sensitized film back of opening 4x. Image rays also are thrown through lens 12x upon prism 13, thence to reflector 14 and from the reflector to ground glass 15. The person at 9 may therefore observe the image just as it will be thrown upon the sensitized film and the image will have the same area. Thus, before exposure of the sensitized film, the person may fix a desired pose by visualizing the pose thrown upon member 15.

In Fig. 2, I have shown a device of the general character of that shown in Fig. 1, means being provided however for enlarging the image thrown upon the visualizer. To that end, in addition to the lenses 12, 12x and the prism 13, I have provided an enlarging lens 17 adapted to throw the enlarged image upon reflector 18 and thence in enlarged form upon the ground glass 19.

The remaining elements are of the same construction as those shown in Fig. 1 and bear the same numerals.

The device shown in Fig. 2 is desirable when an enlarged and therefore more easily observed image reproduction on the visualizer is desired.

In Fig. 2A I have shown a box-type of camera 45, and a simple form of ground glass visualizer 46 at the top thereof. The image rays are projected by the lens 47 to the sensitized plate or other medium 48 and part of the rays are diverted by the prism 49 to the visualizer 46.

In Fig. 3, I have shown a camera box having at its front wall a frame to receive a small photograph, the frame being shown at 20 and at the side of the frame and within the box I have provided means for illumination at 21, the illumination reflecting the image back through lenses 22 and thence upon an angular reflector 23 so disposed as to throw the image in enlarged form upon a second reflector 24 and thence forwardly in still enlarged form upon the ground glass 25, the latter being preferably hooded by the side, top and bottom walls indicated at 26. Such a device will enable visualization of an enlargement of a portrait photograph or the like.

In Fig. 5, I have shown a construction in general principle the same as that illustrated in Fig. 1. At 27, I have shown a supporting frame for a sensitized plate or other sensitized medium and at 28 a bellows leading to a rigid frame 29, the latter being supported upon a base 30. At each side of member 27 there will be fixed a horizontal rack 31 in mesh with a drive pinion 32 on a shaft leading to a hand-wheel 33, in Fig. 6, supported by bracket member 34, the latter being carried to base 30.

Above bellows 28 and forwardly of fixed frame member 29, is a second bellows 35 forwardly of which is a supporting frame 36 for a visualizing glass 37. Frame 36 at each side of the device is supported by a vertical arm 38 held by a horizontal rack arm 39, the teeth of the rack being in mesh with pinion 32.

The interior of bellows 28 is encased with a box-like member 40 of the camera, the member carrying lens tube 41 having suitable lenses such as the rear lens 42.

In register with lens 42 is a prism 43 which throws image rays upwardly through the open base of bellows 35.

It will be understood that the bellows of a visualizing member will closely fit the box-like member 40, and, at the same time be extensible thereon.

The image rays projected upwardly by prism 43 will be received upon an angular reflector 44 and thence in enlarged form upon ground glass 37. By turning handwheel 33, simultaneous enlargement or reduction in area of the image thrown upon the sensitized medium and upon the ground glass 37 may be secured, as will be understood without further explanation.

The visualizing camera construction shown in Figs. 7 and 8 is the same as that shown in the preceding Figs. 5 and 6 and like numerals have been given thereto. It will be noted that there has been added to the structure of Figs. 5 and 6 a casing 42 having a central aperture at 43 for visualization by the sitter of the ground glass 37.

Within the casing at the left hand side is an inclined mirror 44 and at the right hand side an inclined mirror 45. Adjustably mounted within the casing is a reflector 46 which may be a mirror. Means will be provided for rotating the reflector on its vertical axis and for bodily moving it to a position at the side of ground glass 37, for example, to the position shown in dotted lines 46, Fig. 7. The means for this adjustment of the reflector may be a handle member 47 carried by the reflector at its top and passing through a slot at 48 in the top wall of the casing, the reflector carrying at its base a pivot pin 47x which may pass through a slot similar to 48 formed in the bottom wall of the casing. This will permit operation of handle 47 to rotate the reflector so that it will assume the position shown in Fig. 7 for reflecting an image forwardly reflected from mirror 44 and ground glass 37, to mirror 44, or reflector 46, may be turned to reflect the image upon mirror 45.

The casing may be provided with a mirror at its front having openings or windows not only at 43 but at 43x in register with mirror 44 and 43xx in register with mirror 45.

When a sitter faces the lens assembly at 41 for a full face portrait, handle 47 may be moved longitudinally in slot 48 and then swung to be carried to the dotted line position 46 and thus to one side of the ground glass 37. The sitter may then have unimpeded view of the image on the ground glass 37.

When the profile view is desired, the sitter may turn to the left, the reflector 46 being in the full line position of Fig. 7, and observe his profile image on mirror 44. When the reflector is swung on its pivot to throw the image on mirror 45, a reverse profile view of the sitter will be observed on said mirror 45.

Having described my invention, what I claim and desire to secure by Letters Patent, is as follows—

1. A camera visualizer comprising a casing having front and back walls and adapted to receive rays of an image through its front wall, a visualizing reception member supported by the casing at the front area thereof and in position to be viewed by a person facing said front wall, supporting means having a reception area for a sensitized sheet, a lens adapted to receive the image rays and to transmit the same rearwardly of the said front wall, a reflector disposed angularly of the lens and adapted to receive part of the rays of the image projected thereby and also adapted to pass the remaining rays to said sensitized sheet reception area of the supporting means, and an opposed reflector in angular relationship reverse to that of the first-named reflector and in operative register with the rear face of the visualizing reception member.

2. A camera visualizer comprising a casing having front and back walls and adapted to receive rays of an image through its front wall, a visualizing reception member supported by the casing at the front area thereof to be viewed by a person facing the same, an objective lens adapted to receive the image rays and to transmit the same rearwardly of the said front wall, means for receiving a sensitized medium rearwardly of the lens system, a prism within the path of and receiving image rays from said objective lens and projecting parts of the same laterally thereof, the remaining rays passing without interference from the prism to the sensitized medium receiving means and an enlarging lens receiving image rays from the prism, and a reflector disposed in angular relationship to the prism and adapted to receive the image rays and to throw the image rays forwardly upon the visualizing reception member.

3. A device constructed in accordance with claim 2, in which the casing comprises two bellows-walled sections, one a section rearwardly of the lens for the sensitizing medium, and the second a bellows-walled section carrying the visualizing reception member in combination with means for simultaneously extending and retracting each of said bellows sections.

4. A camera visualizer comprising a casing, a lens carried by the front wall of the casing and adapted to receive rays of an image and to project the same inwardly, a visualizing reception member supported by the casing at the front wall thereof, a ray reflecting system within the casing adapted to receive image rays from said lens and to project them forwardly upon said visualizer, a second casing fixed to the first named casing disposed forwardly of said visualizing reception member, two mirrors within said second casing and at opposite sides of the visualizing reception member, and an adjustable reflector within said second casing forwardly of the visualizing reception member and mounted for movement into either one of two positions in optical register with either one of said mirrors and thereby being adapted to reflect an image from said member to either one of the said mirrors within the casing.

JOHN A. SLACK.